United States Patent Office 3,409,624
Patented Nov. 5, 1968

3,409,624
ESTERS OF 2-NITRO-3-PYRIDOLS
Roy C. De Selms, San Rafael, Calif., assignor to Chevron Research Company, San Francisco, Calif., a corporation of Delaware
No Drawing. Filed Feb. 17, 1966, Ser. No. 528,084
7 Claims. (Cl. 260—294.8)

ABSTRACT OF THE DISCLOSURE

Compounds of the formula

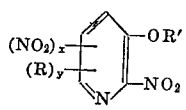

wherein R is lower alkyl or halogen of atomic number 9 to 35, $y$ is 0 or an integer from 1 to 3, $x$ is 0 or 1 and R' is a carboxyacyl, sulfonyl, carbamyl having 0 to 1 nitrogen substituents, alkoxycarbonyl or aryloxycarbonyl group. These compounds are herbicidal.

---

The subject of this invention is a new group of pyridolic esters which are useful herbicides. More particularly, it concerns esters of 2-nitro-3-pyridols.

Although a great many herbicidally active compounds have been developed recently, the problem of effectively controlling undesirable vegetation is still very prevalent. Hence, searching for new and effective herbicidal compounds continues to be of great importance.

Among the most efficient herbicides are those which have selective pre-emergence activity. These compounds kill seeds, germinating seeds and seedlings of undesirable plants without harming contiguous, desirable vegetation. Of importance to the value and use of such a compound is whether it may be easily formulated with common organic solvents for herbicide compositions. Among the advantages of such a compound is that it can be transported as a low volume concentrate ready for further dilution, formulated with other liquid soluble pesticides and absorbed readily and immediately by soil.

A new group of pyridolic esters has now been discovered which have excellent pre-emergence herbicidal activity and at the same time are formulatable with common organic solvents for herbicides.

These unique compounds are carboxylate, carbonate, carbamate and sulfonate esters of 3-pyridols having 1 to 2 nuclear nitro substituents, one of which is in the 2-position in the pyridol nucleus, and 0 to 3 nuclear substituents selected from the group consisting of lower alkyl such as methyl, ethyl, propyl and the like and halogen of atomic number 9 to 35, i.e., fluorine, chlorine and bromine, preferably chlorine or bromine. Structurally these compounds are represented by the general formula:

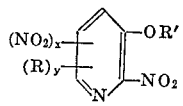

wherein R is lower alkyl or halogen of atomic number 9 to 35, $y$ is 0 or an integer from 1 to 3, $x$ is 0 or 1 and R' is a carboxyacyl, sulfonyl, carbamyl having 0 to 1 nitrogen substituents, alkoxycarbonyl or aryloxycarbonyl group. Preferred compounds are those wherein $x$ and $y$ are 0.

In the carbonic acid, carboxylic acid and carbamic acid esters the nuclear oxygen of the pyridol is bound to a carbonyl group. For these esters, R' in the above formula may represent the following radicals:

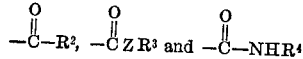

where $R^2$ is an organic radical having 1 to about 20 carbon atoms, usually 1 to about 10 carbon atoms, such as alkyl, alkenyl, cycloalkyl and aryl, aryloxyalkyl, haloaryloxyalkyl, haloalkyl, haloaryl, nitroaryl or a heterocyclic group, Z is oxygen or sulfur, $R^3$ is a hydrocarbyl group having 1 to about 10, usually 1 to 6, carbon atoms such as alkyl and phenyl or a halohydrocarbyl group having 1 to 10 carbon atoms such as haloalkyl or halophenyl and $R^4$ is a hydrocarbyl or halohydrocarbyl group having 1 to about 8 carbon atoms such as alkyl, cycloalkyl and aryl, haloalkyl or haloaryl. The halogens which may be present on these ester groups are desirably Cl or Br.

Examples of R' groups having a carbonyl bound to the nuclear oxygen of the pyridol are acetyl, butyryl, cyclohexanoyl, acrylyl, octanoyl, dodecanoyl, hexadecanoyl, crotonyl, benzoyl, nitrobenzoyl, toluoyl, naphthoyl, trichloroacetyl, bromoacetyl, 2,2-dichloropropanoyl, methoxycarbonyl, ethoxycarbonyl, hexoxycarbonyl, phenoxycarbonyl, phenylthiocarbonyl, ethylthiocarbonyl, carbamyl, N-methylcarbamyl, N-propylcarbamyl, N-cyclohexylcarbamyl, N-phenylcarbamyl and the like.

In the sulfonates of this invention the nuclear oxygen of the pyridol is bound to a sulfonyl (SO₂) group. In these sulfonate esters R' represents the following radical:

where $R^5$ represents a hydrocarbyl group having 1 to about 10 carbon atoms such as alkyl, aryl and cycloalkyl. Examples of sulfonate radicals are ethanesulfonyl, hexanesulfonyl, methanesulfonyl, cyclohexanesulfonyl, benzenesulfonyl, toluenesulfonyl and the like.

Examples of typical pyridol esters falling within the general formula above are:

3-acetoxy-2-nitropyridine,
3-acetoxy-2,4-dinitropyridine,
2-nitro-3-propanoyloxypridine,
3-isopropanoyloxy-5-methyl-2-nitropyridine,
4-ethyl-2,6-dinitro-3-pentanoyloxypyridine,
3-hexanoyloxy-6-methyl-2-nitropyridine,
5-chloro-2-nitro-3-octanoyloxypyridine,
3-cyclohexanoyloxy-2-nitropyridine,
3-cyclobutanoyloxy-2,4-dinitropyridine,
3-benzoyloxy-2-nitropyridine,
4,5-dimethyl-3-(2-naphthoyloxy)-2-nitropyridine,
3-(2-thienoyloxy)-2-nitropyridine,
2,4-dinitro-3-butyryloxypyridine,
3-(2-furoyloxy)-2-nitropyridine,
3-methoxycarbonyloxy-2-nitropyridine,
3-hexoxycarbonyloxy-2-nitropyridine,
2,6-dinitro-3-phenoxycarbonyloxypyridine,
3-benzyloxycarbonyloxy-2-nitropyridine,
3-benzenesulfonyloxy-2-nitropyridine,
5-bromo-2-nitro-3-(p-toluenesulfonyloxy)-pyridine,
3-ethanesulfonyloxy-2-nitropyridine and
3-methanesulfonyloxy-4-methyl-2-nitropyridine.

The invention compounds may be made by acylating a suitable nitro-substituted 3-pyridol, nitro-substituted alkyl-3-pyridol or nitro-substituted halo-3-pyridol. In the acylation these pyridols act as alcohols. Known techniques are used in the acylation. As an acylating agent acyl halides are especially useful. Stoichiometric or excess proportions of acylating agent will normally be used.

The nitro-substituted 3-pyridol precursors of the invention compounds are made by reacting 3-pyridol, alkyl-3-pyridol or halo-3-pyridol with a strong nitrating agent such as concentrated nitric acid, mixtures of nitric and sulfuric acid or a nitrate which is soluble in sulfuric acid. This reaction is carried out in the presence of an acidic anhydrous dehydrating medium such as concentrated sulfuric or phosphoric acid. Temperatures between about 5 and 100° C., usually between 0 and 50° C., are used along with atmospheric or autogenous pressure. The mol ratio of pyridol to nitrating agent is usually 0.5:1 to 1.5:1. For best results stoichiometric proportions are used.

Compounds of this invention and methods for preparing them are specifically illustrated by the following examples. These examples are offered by way of illustration only and are not to be taken as limiting this invention.

Example 1

Into a flask were charged 5.60 g. 2-nitro-3-pyridol, 100 ml. benzene and 3.22 ml. of pyridine. 2.85 ml. of acetyl chloride was gradually added to this mixture with stirring. Stirring was continued for an additional hour, after which the contents were filtered. The volatiles were stripped from the filtrate and the residue was distilled. 5.39 g. of 3-acetoxy-2-nitropyridine was obtained at 101–107° C., 0.03–0.04 mm. Hg. The structure of this compound was verified by infrared and nuclear magnetic resonance analyses. Wt. percent N: calculated, 15.38; found, 15.67.

Example 2

Into a flask was chagred 14.00 g. of 2-nitro-3-pyridol in 50 ml. of chloroform. To this solution 6.0 g. of methyl isocyanate was added gradually. Three drops of pyridine were added as a catalyst and the mixture was allowed to stand with stirring at ambient temperatures for 16 hours. The precipitate which had formed after this period was collected by filtration, washed with chloroform and dried at 50° C., 15 mm. Hg. 13.5 g. of 3-(methylcarbamyloxy)-2-nitropyridine was obtained. This compound was observed as a solid which melted at 132.5–134.5° C. Its nitrogen analysis was: percent calculated, 21.3; percent found, 21.31.

Example 3

7.0 g. of 2-nitro-3-pyridol, 4.2 g. pyridine and 150 ml. of benzene were put into a vessel. 5.0 g. methylchloroformate was added slowly to this mixture. The combined mixture was allowed to stand overnight at ambient temperature. It was then filtered and the filtrate was washed with water and dried over MgSO₄. The solvent was stripped off under vacuum leaving 8.0 g. crude 3-methoxycarbonyloxy-2-nitropyridine. Recrystallization from water gave 3.5 g. pure product. It melted at 76–77° C. Its analysis was: wt. percent N: calculated, 14.15; found, 14.48.

Example 4

7.0 g. 2-nitro-3-pyridol, 4.2 g. pyridine and 250 ml. benzene were put into a vessel. 11.0 g. of p-chlorobenzenesulfonyl chloride was added slowly to this mixture. The combined mixture was stirred overnight at 40° C. It was then cooled and filtered. The filtrate was washed with water and dried over MgSO₄. The solvent was stripped off under vacuum and the residue was recrystallized from ethanol. 4.0 g. 3 - p - chlorobenzenesulfonyloxy-2-nitropyridine was recovered. It melted at 75–77° C. and had the following N analysis (wt. percent): calculated, 8.9; found, 7.61.

Example 5

7.0 g. 2-nitro-3-pyridol, 4.2 g. pyridine and 100 ml. benzene were put into a vessel. 12.0 g. of 2,4-dichlorophenoxyacetyl chloride was added slowly to this mixture. The combined mixture was allowed to stand at ambient temperature for 2 days. It was then filtered and the solvent was stripped from the filtrate. The stripped filtrate solidified and was recrystallized from ethanol. 6.0 g. of 3 - (2,4 - dichlorophenoxyacetoxy) - 2-nitropyridine were recovered. It melted at 109–113° C. and had the following analysis: wt. percent Cl: calculated, 20.65; found, 20.14. Wt. percent N: calculated, 8.18; found, 7.57.

Using methods similar to those described in Examples 1–5, other nitro-substituted 3-pyridol esters were prepared. For convenience, these compounds along with their physical characterizations are tabulated below.

TABLE I

| Compound | Wt. Percent N | |
|---|---|---|
|  | Calc. | Found |
| 3-(4-chlorobenzoyloxy)-2-nitropyridine | 10.05 | 9.64 |
| 3-(isobutyryloxy)-2-nitropyridine | 13.33 | 12.78 |
| 3-(2-furoyloxy)-2-nitropyridine | 12.84 | 11.72 |
| 3-(cyclohexylcarbamyloxy)-2-nitropyridine | 15.86 | 15.50 |
| 3-acetoxy-6-methyl-2-nitropyridine | 14.3 | 15.45 |
| 3-acetoxy-5-methyl-2-nitropyridine | 14.3 | 13.99 |
| 3-[methyl-(4-chloro-2-methylphenoxy)acetoxy]-2-nitropyridine | 8.32 | 7.64 |
| 3-benzenesulfonyloxy-2-nitropyridine | ¹11.29 | ¹11.05 |
| 3-benzoyloxy-2-nitropyridine | 11.47 | 11.43 |
| 3-acetoxy-4-methyl-2-nitropyridine | 14.3 | 14.40 |
| 3-acryloyloxy-2-nitropyridine | 14.41 | 13.55 |
| 3-(p-chlorophenylcarbamyloxy)-2-nitropyridine | 14.32 | 14.00 |
| 2-nitro-3-octanoyloxypyridine | 10.29 | 10.67 |
| 3-crotonyloxy-2-nitropyridine | 13.45 | 12.62 |
| 3-(p-nitrobenzoyloxy)-2-nitropyridine | 14.01 | 14.10 |
| 2-nitro-3-trichloroacetoxypyridine | 9.89 | 10.00 |
| 3-chloroacetoxy-2-nitropyridine | 13.31 | 12.75 |
| 3-(2,2-dichloropropanoyloxy)-2-nitropyridine | 10.54 | 10.33 |
| 3-chrysanthemumyloxy-2-nitropyridine | 9.68 | 8.86 |
| 3-(1-naphthylacetoxy)-2-nitropyridine | 9.34 | 9.28 |
| 3-heptanoyloxy-2-nitropyridine | 11.12 | 10.90 |
| 2-nitro-3-phenylthiocarbonyloxypyridine | 10.15 | 9.78 |
| 3-methanesulfonyloxy-2-nitropyridine | 12.65 | 12.33 |
| 3-decanoyloxy-2-nitropyridine | 9.56 | 8.90 |
| 3-butanesulfonyloxy-2-nitropyridine | 12.32 | 11.32 |
| 2-nitro-3-pentanoyloxypyridine | 12.52 | 12.58 |
| 2-nitro-3-oleoyloxypyridine | 6.89 | 6.82 |
| 3-dodecanoyloxy-2-nitropyridine | 8.74 | 8.22 |

¹ Percent sulfur.

In general, the compounds of this invention are either completely or nearly completely soluble in at least one organic solvent which is commonly used to formulate herbicides. Typical solvents which may be used are petroleum fractions and aromatics. Therefore, they may be easily and readily formulated as concentrates ready for further dilution before being applied to plant environments in herbicidally effective amounts. Alternatively they can be made up at concentrations suitable for direct application to plant environments. For best herbicidal control these formulations will also contain an adjuvant such as a wetting or dispersing agent to facilitate their penetration into the environment and generally enhance their effectiveness.

Additionally, these herbicidal formulations may contain compatible fungicides, nematocides, biocides, insecticides and other herbicides and pesticides as well as conditioners, fillers, growth stimulators, plant hormones and the like.

Compounds of this invention have a wide range of pre-emergence herbicidal activity against undesirable grasses, broadleaf weeds and other noxious vegetation. They have been used to kill or control such undesirable vegetation as mustard, rye grass, pigweed, bermuda grass, crabgrass, watergrass and lambsquarter. At the same time they were not toxic at normal use dosages to crop plants such as crop grasses, corn, sugar beets and alfalfa. Compounds of this invention also exhibit post-emergence activity, particularly those in which the ester groups contain between about 6 to 12 carbon atoms.

Compounds of this invention have also shown some activity against fungi such as *Pythium ultimum, Rhizoctonia solani, Fusarium oxysporum, Helminthosporium sativum, Monilinia fructicola* and *Alternaria solani.*

As will be evident to those skilled in the art, various modifications on this invention can be made or followed, in the light of the foregoing disclosure and discussion, without departing from the spirit or scope of the disclosure or from the scope of the following claims.

I claim:
1. Compound of the formula

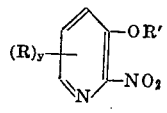

wherein y is 0 or an integer in the range of 1 and 2, R is lower alkyl, Cl or Br and R' is a radical selected from the group consisting of

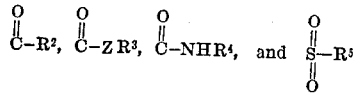

wherein R² is thienyl, furyl, haloalkyl having 1 to 10 carbon atoms in which the halogen is Cl or Br, monocyclichaloaryloxyalkyl of 7 to 10 carbon atoms in which the halogen is Cl or Br, or a hydrocarbyl radical containing 1 to 10 carbon atoms, said radical selected from the group consisting of alkyl, alkenyl and cycloalkyl, Z is oxygen or sulfur, R³ has 1 to 10 carbon atoms and is alkyl, haloalkyl in which the halogen is Cl or Br, phenyl or halophenyl in which the halogen is Cl or Br, R⁴ has 1 to 8 carbon atoms and is alkyl, cycloalkyl, monocyclicaryl, haloalkyl in which the halogen is Cl or Br or monocyclichaloaryl in which the halogen is Cl or Br, and R⁵ is phenyl or alkyl of 1 to 10 carbon atoms.

2. The compounds of claim 1 wherein

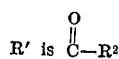

and R² is 2,4-dichlorophenoxymethyl, isopropyl, furyl, methyl, 1-(4-chloro-2-methylphenoxy)ethyl, vinyl, 1-propenyl, heptyl, trichloromethyl, chloromethyl, 1,1-dichloroethyl, 2-isobutenyl-3,3-dimethylcyclopropyl, hexyl, nonyl or butyl.

3. The compounds of claim 1 wherein y is 0.

4. The compounds of claim 3 wherein

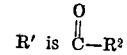

and R² contains 1 to 10 carbon atoms and is alkyl, alkenyl or cycloalkyl.

5. The compounds of claim 3 wherein

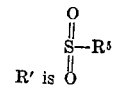

and R⁵ is an alkyl group having 1 to 10 carbon atoms or phenyl.

6. Compounds of claim 3 wherein

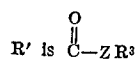

and Z is oxygen or sulfur and R³ is alkyl of 1 to 6 carbon atoms or phenyl.

7. The compounds of claim 3 wherein

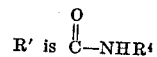

and R⁴ is methyl, cyclohexyl or p-chlorophenyl.

References Cited

Takahashi et al.: Chem. Abstracts, vol. 52, par. 13, 722–3, 1958.

Wurst et al.: J. Am. Chem. Soc., vol. 73, pp. 1210–16 (1951).

HENRY R. JILES, *Primary Examiner.*

A. L. ROTMAN, *Assistant Examiner.*